United States Patent [19]

Vogts et al.

[11] Patent Number: 5,369,904
[45] Date of Patent: Dec. 6, 1994

[54] BALANCED FISHING ROD

[75] Inventors: Steven W. Vogts; Mark S. Klammer, both of Mankato, Minn.

[73] Assignee: Johnson Fishing, Inc., Mankato, Minn.

[21] Appl. No.: 118,417

[22] Filed: Sep. 8, 1993

[51] Int. Cl.⁵ .............................................. A01K 87/00
[52] U.S. Cl. ..................................................... 43/18.1
[58] Field of Search .................... 43/18.1, 18.5, 22, 23, 43/25

[56] References Cited

U.S. PATENT DOCUMENTS

| | | | |
|---|---|---|---|
| 849,481 | 4/1907 | Lobit | 43/18.1 |
| 1,731,172 | 10/1929 | Pope . | |
| 2,194,639 | 3/1940 | Cole | 43/18 |
| 2,816,389 | 12/1957 | Sens | 43/18.1 |
| 3,121,290 | 2/1964 | Brown | 43/18 |
| 3,150,460 | 9/1964 | Dees | 43/18.1 |
| 3,367,056 | 2/1968 | Johnson | 43/25 |
| 3,468,052 | 9/1969 | Hardesty et al. | 43/23 |
| 4,653,215 | 3/1987 | Strader | 43/18.1 |

OTHER PUBLICATIONS

P.9 from 1993 Spring/Summer Gander Mountain catalog.

Primary Examiner—P. Austin Bradley
Assistant Examiner—Chuck Y. Mah
Attorney, Agent, or Firm—Foley & Lardner

[57] ABSTRACT

A fishing rod having a handle section, a tip and a counter-balance assembly is provided. The tip is attached to one end of the handle section and the counter-balance assembly is coupled to the other end of the handle section. The torque applied to the handle section of the fishing rod by the tip of the rod is offset by a an equal and opposite torque applied to the handle section by the counter-balance assembly, consequently locating the balance point of the fishing rod in the handle section of the fishing rod.

24 Claims, 3 Drawing Sheets

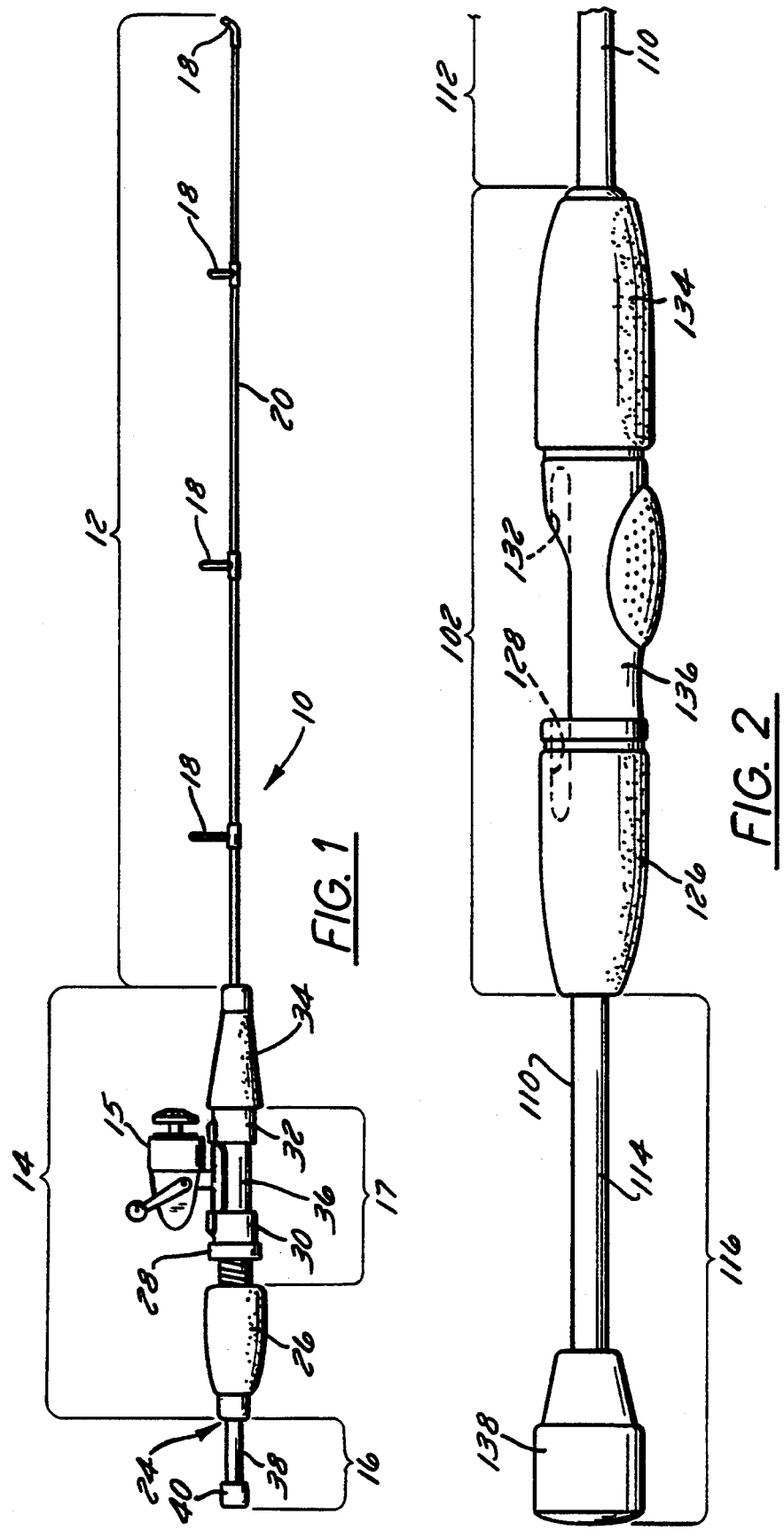

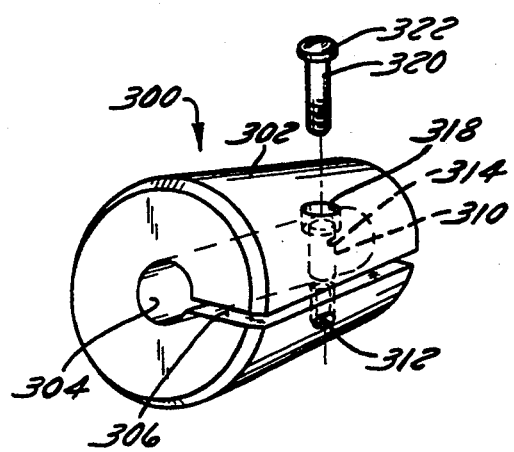
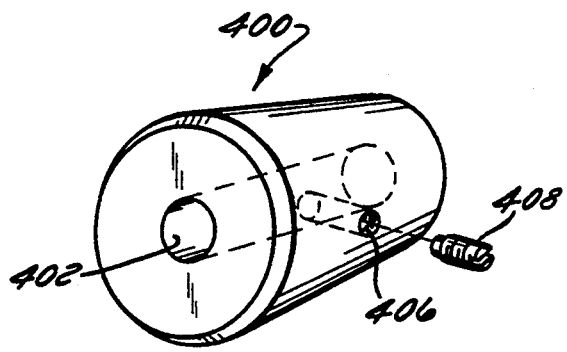
FIG. 3
FIG. 4
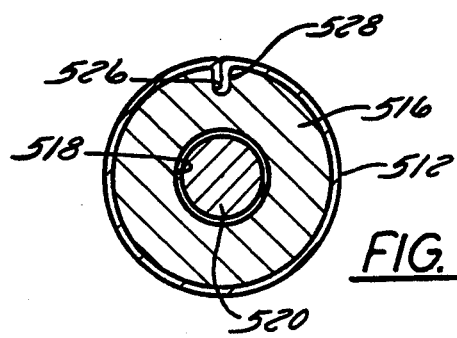
FIG. 6
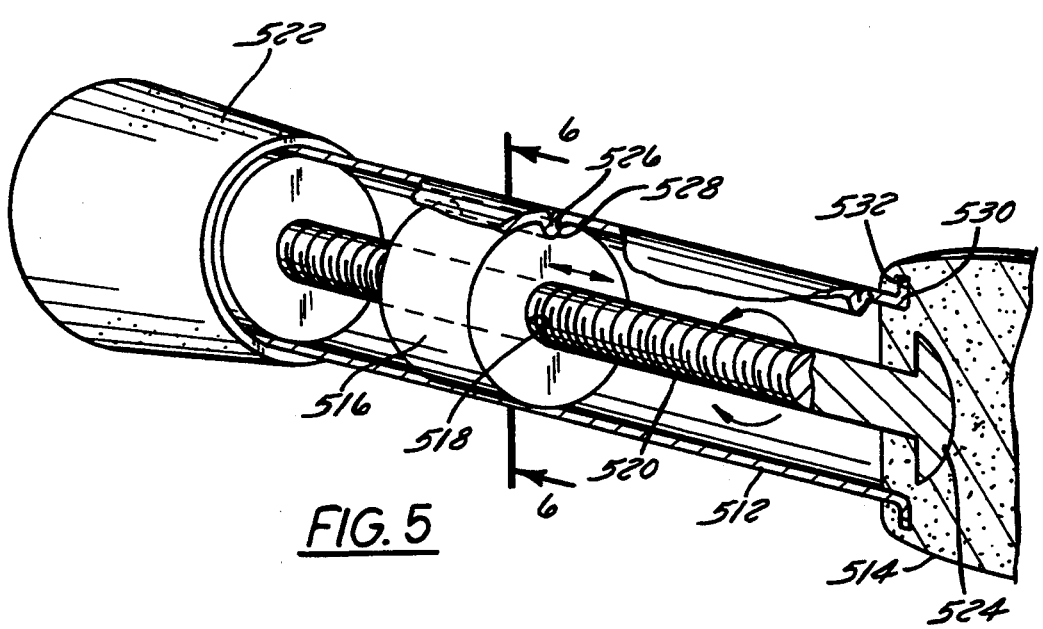
FIG. 5

BALANCED FISHING ROD

FIELD OF INVENTION

The present invention relates to fishing equipment, and more particularly to devices for increasing the sensitivity of a fishing rod.

BACKGROUND OF INVENTION

It is well known that success at catching fish often hinges on the ability to react quickly when a fish strikes. One's reaction time is determined, in part, on the ability to sense, through the handle of a rod, the forces exerted on the tip of the rod by a strike. A rod's ability to communicate these forces to the hands of a user is referred to as the rod's sensitivity. In general, the more sensitive the rod, the faster one may react to a strike, and, consequently, the fewer the fish that get away.

The sensitivity of a rod is diminished, however, when forces other than those caused by the strike of a fish are communicated by the rod. Such forces include, for example, those caused by the weight of the rod. Consequently, efforts have been made to increase the sensitivity of fishing rods by decreasing the weight thereof. Rods made of extremely light-weight material, such as graphite, are now common.

However, the overall weight of a rod is only one factor which affects a rod's sensitivity. Another factor is how that weight is distributed with respect to the handle of the rod. Specifically, the center of gravity or "balance point" of a typical fishing rod is not where a fisherman typically holds the rod. Rather, the balance point in conventional fishing rods is in the fore grip or lower shaft section of the rod, making such rods top-heavy.

This imbalance not only results in forces which make it harder to detect strikes, but also encourages users to lower the tips of their rods while fishing. When the tip of a rod is lowered, the rod is less likely to be perpendicular to the fishing line extending from its tip, which is the optimal angle for bite sensitivity.

Fishing rods have been developed which have extended or extendable butt grips to provide additional leverage for landing a fish. Such butt grips are generally made of light material, such as foam or cork, so as to minimize the overall weight of the fishing rod. Because such extended butt grips are light, they have little effect on the balance of the rod. Thus, conventional wisdom clearly teaches away from the use of heavy material which will increase the overall weight of a rod.

In light of the foregoing, a fishing rod having increased sensitivity is clearly desirable. In addition, a fishing rod which minimizes the imbalance-related forces on the hand of a fisherman is desirable. Further still, a fishing rod which increases the sensitivity of the rod without burdening the fishing rod or line with bulky extraneous devices is clearly desirable. Finally, a fishing rod which encourages the user to hold a fishing rod at an optimal angle is clearly desirable.

SUMMARY OF THE INVENTION

According to one aspect of the present invention, a balanced fishing rod is provided. The fishing rod has a handle section which includes a gripping region. The balance point of the fishing rod is in the gripping region.

According to another aspect of the present invention, a counter-balance assembly for use on a fishing rod having a gripping region, and a balance point initially outside of the gripping region, is provided. The counter-balance assembly is couplable to the fishing rod to cause the balance point of the fishing rod to fall within the gripping region.

According to yet another aspect of the present invention, a fishing rod is provided which includes a gripping region and a reel attached to a point in the gripping region. The fishing rod further includes a first portion extending from one side of the gripping region, and a second portion extending from the other side of the gripping region. The first portion of the fishing rod applies a first torque at a predetermined point in the gripping region, and the second portion applies a second torque at the predetermined point in the gripping region. The first torque is equal and opposite to the second torque, whereby the balance point of the fishing rod is at the predetermined point in the gripping region.

BRIEF DESCRIPTION OF THE DRAWINGS

The features of the present invention, which are believed to be novel, are set forth with particularity in the appended claims. The invention, together with further objects and advantages thereof, may best be understood by making reference to the following description taken in conjunction with the accompanying drawings, in the several figures of which like reference numerals identify like elements, and wherein:

FIG. 1 is a side view of a fishing rod according to one embodiment of the present invention;

FIG. 2 is a side view of the handle and counter-balance assembly of a fishing rod according to an alternative embodiment of the present invention;

FIG. 3 is a side perspective view of a counter-balance weight according to one embodiment of the invention;

FIG. 4 is a perspective view of a counter-balance weight according to an alternative embodiment of the invention;

FIG. 5 is an sectional perspective view of a counter-balance assembly according to an alternative embodiment of the invention;

FIG. 6 is a cross-sectional view of the counter-balance assembly shown in FIG. 5 taken across line 6—6;

FIG. 8b is an elevation view of the counter-balance assembly shown in FIG. 8a.

DETAILED DESCRIPTION OF THE PREFERRED EMBODIMENT

Figure 7:
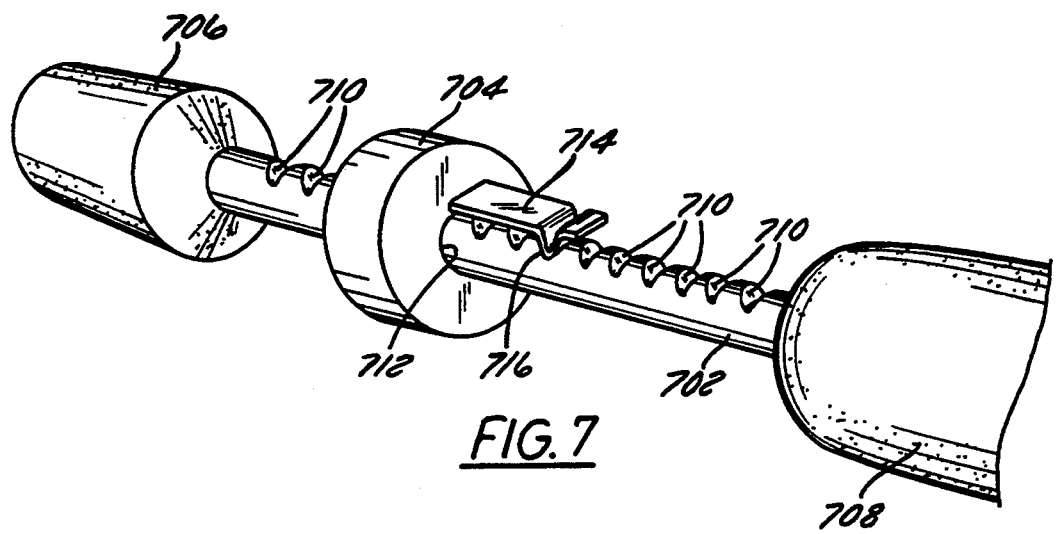
FIG. 7 is a perspective view of a counter-balance assembly according to yet another embodiment of the invention.

Referring to FIG. 1, a balanced fishing rod 10 is shown according to one embodiment of the present invention. The fishing rod 10 generally includes a tip 12, a handle section 14, a reel 15 and a counter-balance assembly 16.

The tip 12, handle section 14, and reel 15 may all be conventional. For example, the tip 12 may include a plurality of line guides 18 attached to a rod blank 20 at spaced intervals. The handle section 14 may include a butt grip 26, a fore grip 34, a reel seat 36 and a reel attachment assembly 17 for attaching the reel 15 to the fishing rod 10 at the reel seat 36. And the reel 15 may be an open faced spinning reel.

The rod blank 20 may also be conventional. For example, the rod blank 20 may be made of a lightweight material such as graphite, and either be unitary, as shown, or include two or more rod blank sections that may be arranged to form a single shaft, as is common in the art.

Reel attachment assembly 17 may be any assembly designed to attach a reel to a rod. For example, reel attachment assembly 17 may be a lock ring assembly including a rear hood 30, a lock ring 28, and a front hood 32.

The counter-balance assembly 16 extends axially from a proximal end 24 of the handle section 14 and includes an extension rod 38, which is attached to the proximal end 24 of the handle section 14, and a weight 40.

The weight of weight 40 and extension rod 38 counter the weight of tip 12, causing the balance point of the fishing rod 10 to shift towards the proximal end 24 of the fishing rod 10. Consequently, the balance point of rod 10 falls within the region of the fishing rod 10 typically gripped by a user (the "gripping region"), rather than in the fore grip 34 or tip 12 of the fishing rod 10. The gripping region begins substantially at the front hood 32 of the fishing rod 10 and extends backward to include the reel seat 36 and the butt grip 26 of the fishing rod 10.

The effect of counter-balance assembly 16 on the balance of rod 10 may be understood technically in terms of torque. Specifically, a conventional rod is top-heavy, meaning that a user feels a net torque when holding a conventional rod in its gripping region. This net torque is felt by the user as a force tending to lower the tip of the rod. The weight of counter-balance assembly 16 also creates a torque in the gripping region. However, since counter-balance assembly 16 is on the opposite side of the gripping region than the tip 12, it creates a torque in a direction opposite that created by the weight of the tip 12. That is, the torque caused by counter-balance assembly 16 is felt by the user as a force tending to raise the tip of the fishing rod 10. Counter-balance assembly 16 is preferably configured to create a torque equal to and opposite the torque created by the tip 12, so that the user feels no net torque when holding the fishing rod 10 in the gripping region.

The extension rod 38 may be the butt end of the rod blank 20, which may be configured to extend through the interior of the handle section 14. Alternatively, the extension rod 38 may be a separate rod, fixedly, slidably, or detachably coupled to the proximal end 24 of the handle section 14.

The weight 40 is fixedly attached to the extension rod 38. However, the weight 40 may alternatively be adjustably attached to the extension rod 38 to allow displacement of the weight 40 along the axis of the extension rod 38. A selectively positionable weight allows the position of the weight 40 to be changed along axis of the extension rod 38, which results in a shift of the balance point of the fishing rod 10. Thus, a user may fine-tune the location of the balance point of the fishing rod 10 to where the user customarily grips the fishing rod 10 by adjusting the displacement of the weight 40 along the axis of the extension rod 38.

The diameter of the weight 40 and the diameter of the extension rod 38 are smaller than the diameter of handle section 14, thereby allowing the fishing rod 10 to be inserted into many of the conventional fishing rod support mechanisms. The weight 40 is composed of a material substantially denser than the material of which the rod blank 20 is composed. For example, the weight 40 may be composed of a relatively heavy metal, such as iron, and the rod blank 20 may be composed of graphite. As a consequence, the counter-balance assembly 16 may be substantially shorter than the tip 12 and still provide a torque in the gripping region to counter the torque applied by the tip 12. A relatively short counter-balance assembly is preferable in that a long counter-balance assembly may render the fishing rod 10 difficult to handle and transport.

Because the balance point of the fishing rod 10 is where a user typically grips the fishing rod 10, the forces applied to the user's hand by the fishing rod 10 are uniform. Thus, when a fish strikes, the balance of the rod is upset, causing the rod to apply non-uniform forces to the hand of the user. The resulting disruption of balance is more easily perceived by a user than the forces caused by the same strike would be in a top-heavy rod. Consequently the user may be able to react faster when strikes occur, thus increasing the chances of catching fish.

In addition, because the fishing rod 10 is not top-heavy, a user may comfortably hold the fishing rod 10 at an angle perpendicular to the fishing line extending from the tip of the fishing rod 10 (typically a forty-five degree angle). As mentioned earlier, a rod held at this angle provides maximum feedback to the user.

Referring to FIG. 2 an alternative embodiment fishing rod according to the present invention, including an alternative handle section 102, is shown. Handle section 102 includes a fore grip 134, a butt grip 126, and a reel seat 136. The distal portion of the reel seat 136 is formed to provide an integral front hood 132. The front portion of the butt grip 126 forms a cavity to provide a rear hood 128. A rod blank 110 forms a tip 112, extends through the handle section 102, and forms an extension rod 114 of a counter-balance assembly 116. The counter-balance assembly 116 includes a grip 138. A weight made of heavy material (not shown) is attached to the counter-balance assembly 116 to act as a counter-balance to offset the weight of the tip 112. The weight may be affixed to the exterior or the interior of either the extension rod 114 or the grip 138. Various alternative embodiments of counter-balance assemblies shall now be described with reference to FIGS. 3 to 8b.

Referring to FIG. 3, an embodiment of a weight 300 for use in a balance-compensation assembly is shown. The weight 300 includes a body 302 which forms a passage 304 and a groove 306. The body 302 is formed of a relatively heavy composition. The passage 304 extends axially through the body 302 whereby an extension rod may be slidably inserted therein. The groove 306 runs parallel to the axis of the body 302 and extends radially from the passage 304 to the outside of the body 302. The body further includes a bore 310 which is perpendicular to and intercepts the groove 306. One side 312 of the bore 310 is threaded, and the other side 314 of the bore 310 defines a screw head cavity 318. A screw 320 may thus be inserted into one side 314 of the bore 310 to bridge the groove 306 and engage the threads in the other side 312 of the bore 310. The screw 320 has a head 322 that is larger than the bore 310. Thus, when the screw 320 is inserted into the bore 310, the head 322 is prevented from passing into the bore 310 beyond the screw head cavity 318.

Thus configured, an extension rod of a fishing rod may be slidably inserted through passage 304, the weight 300 may be suitably adjusted along the length of the extension rod to position the balance point of the fishing rod at a desired position. The weight 300 may then be secured to the extension rod by inserting the screw 320 into the one side 314 of the bore 310, causing the screw to threadedly engage at the other side 312 of the bore 310. When the screw 320 is turned, the threads of the screw pull the side of the body 302 which defines side 312 of the bore 310 toward the side of the body 302 which defines side 314 of the bore 310. Thus, groove 306 is narrowed, causing passage 304 to narrow to securely engage the extension rod inserted therein.

Referring to FIG. 4, an alternative embodiment of a weight 400 is shown. Weight 400 includes a passage 402 into which an extension rod may be inserted, and a bore 406 extending radially into the passage 402 from the outer surface of the weight 400. The bore 406 is threaded for threadedly receiving a set screw 408. Thus configured, an extension rod may be inserted into the passage 402, and the weight 400 may be secured to the extension rod by screwing the set screw 408 into the bore 406 to engage the extension rod in the passage 402.

Referring to FIGS. 5 and 6, a counter-balance assembly 510 according to an alternative embodiment is shown. The counter-balance assembly 510 includes a hollow extension rod 512, a weight 516, a threaded rod 520 and a grip 522. The counter-balance assembly 510 extends from the butt end 514 of a fishing rod.

The weight 516 threadedly engages the threaded rod 520 in a threaded bore 518, and is slidably disposed within the interior of the extension rod 512. The threaded rod 520 has a head 524 which is fixedly attached to end 514 of the fishing rod. For example, the head 524 may be embedded within the end 514 of the rod, as shown. The weight 516 has a groove 526 on its outer surface that runs parallel to its threaded bore 518.

The interior of the extension rod 512 has a ridge 528 which extends into the groove 526 of the weight 516. The extension rod 512 further includes an outwardly-extending rim 530 which is slidably disposed in a slot 532 at the end 514 of the rod. Thus secured, the extension rod 512 is free to rotate relative to the rod and the threaded rod 520.

When the extension rod 512 is rotated relative to the threaded rod 520, the ridge 528 on the interior of the extension rod 512 pushes against the walls of the groove 526 in the weight 516 to cause the weight 516 to also rotate relative to the threaded rod 520. Because the weight 516 is threadedly engaged with the threaded rod 520, the rotation of the weight 516 relative to the threaded rod 520 causes the weight 516 to be displaced along the axis of the threaded rod 520. Thus, by rotating the extension rod 512, a user of the fishing rod may selectively adjust the axial displacement of the weight 516 within the extension rod 512. The displacement of the weight 516 relative to the end 514 of the rod determines the balance point of the fishing rod. Therefore, by rotating the extension rod 512, a user may fine-tune the balance of the fishing rod according to his needs. For example, the user may adjust the disposition of the weight 516 based upon the particular reel, bait and lure the user is using.

Referring to FIG. 7, a counter-balance assembly 700 is shown according to another embodiment of the invention. The counter-balance assembly 700 includes an extension rod 702 attached to a butt end 708 of a rod, a weight 704, and a grip 706. The extension rod 702 includes a plurality of lateral notches 710, and the weight 704 has a bore 712 for slidably receiving the extension rod 702.

A flexible latch arm 714 is fixedly attached to the weight 704 and extends from the weight 704 parallel to the extension rod 702. The end of the latch arm 714 opposite the weight 704 is formed into a wedge 716. The flex of latch arm 714 biases the wedge 716 against the extension rod 702.

Thus configured, the axial position of weight 704 on extension rod 702 may be selectively adjusted by lifting up on the latch arm 714, sliding the weight 704 to the desired position on the extension rod 702, and releasing the latch arm 714. Upon release, the wedge 716 of the latch arm 714 is biased into one of the notches 710 on the extension rod 702 to lock the weight 704 into position.

Figure 8A:
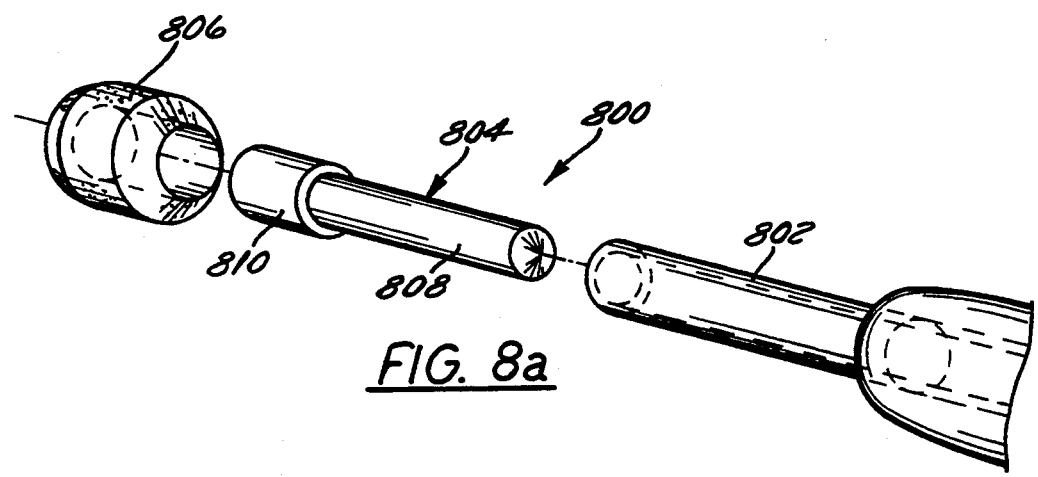
FIG. 8a is an exploded perspective view of the presently preferred embodiment of a counter-balance assembly.
Figure 8B:
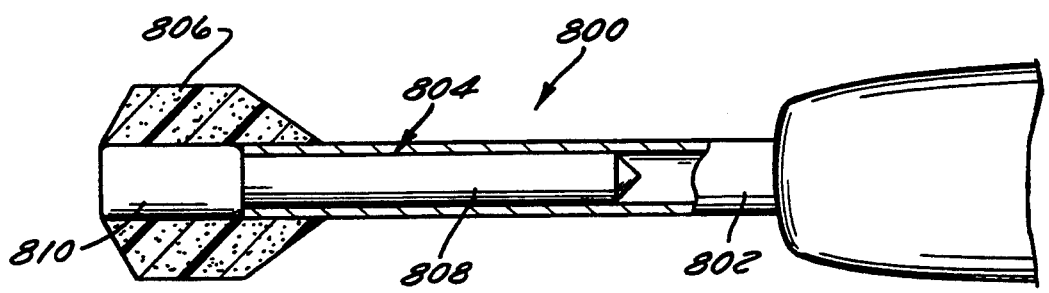

Referring to FIGS. 8a and 8b, an alternative, preferred embodiment of a counter-balance assembly 800 is shown. Counter-balance assembly 800 generally includes an extension rod 802, a weight 804 and a grip 806. Extension rod 802 is hollow, and is preferably the butt end of the rod blank of a fishing rod.

Weight 804 is composed of heavy material, such as metal. The shape of weight 804 is generally cylindrical and has a narrow cylindrical section 808 and a broad cylindrical section 810. The broad section 810 has a diameter substantially equal to the diameter of the extension rod 802, while the narrow section 808 has a diameter substantially equal to the diameter of the bore of the extension rod 802.

The grip 806 is hollow, with a bore having a diameter substantially equal to the diameter of the broad section 810 of the weight 804. The grip 806 is preferably made of a tractive material, such as foam rubber.

Counter-balance assembly 800 is assembled by inserting narrow section 808 of the weight 804 into the bore of the extension rod 802, and then inserting the weight 804 and the extension rod 802 into the bore of the grip 806. The assembled counter-balance assembly 800 thus created is shown in FIG. 8b. Adhesive is preferably applied to the surfaces of the weight 804, the extension rod 802, and the grip 806, where these components contact each other, to prevent the counter-balance assembly 800 from disassembling during use.

As has been described in detail above, a fishing rod made according to the present invention is balanced. That is, the balance point of the fishing rod is where a user typically grips the rod. Consequently, it is easier for someone holding the fishing rod to feel the jerks caused by the nibble of a fish through the handle of the rod. The balance of the rod is achieved by a counter-balance assembly located at the proximal end of the rod. The size and weight characteristics of this assembly are selected to counter the weight of the tip. The assembly includes a component, such as a weight, that is made of a heavier material than the rod blank so that the assembly can effectively counter the weight of the tip without having to be as long as the tip. The assembly may include a weight that can be moved closer to or further away from the handle. By adjusting the position of the weight, a user can fine-tune the location of the balance point of the fishing rod.

It will be understood that the above description is of only a few embodiments of the invention, including the preferred embodiment, and that the invention is not limited to the specific forms shown. For example, the coupling between the weight and the extension rod may take any number of forms to allow the weight to be selectively positionable along the axis of the extension rod. Alternatively, the extension rod and weight may be incorporated into one or more members of any shape which, when attached to the proximal end of the handle section of a fishing rod, shift the balance point of the fishing rod to a point in the handle section of the fishing rod. Various other substitutions, modifications, changes and omissions may be made in the design and assembly of the elements without departing from the spirit of the invention as expressed in the appended claims.

What is claimed is:

1. A balanced fishing rod, comprising a tip, a counter-balance assembly, a handle section intermediate said tip and said counter-balance assembly and including a gripping region, and a balance point, said balance point being disposed in said gripping region, the rod having a longitudinal axis, said tip, said counter-balance assembly and said handle section being substantially coincident with said longitudinal axis, said counter-balance assembly further comprising a relatively heavy weight having a density substantially greater than that of the rod and being selectively positionable along said longitudinal axis.

2. The fishing rod of claim 1 wherein said handle section has a distal end and a proximal end, wherein said distal end of said handle section is attached to said tip, said tip causing a first torque when the fishing rod is held at a predetermined point in said gripping region, and wherein said counter-balance assembly is attached to said proximal end of said handle section, said counter-balance assembly causing a second torque when the fishing rod is held at said predetermined point in said gripping region, wherein said second torque is equal in magnitude and opposite in direction to said first torque, whereby the balance point of the fishing rod is at said predetermined point in said handle section.

3. The fishing rod of claim 1 wherein said counter-balance assembly comprises an extension rod supporting said weight.

4. The fishing rod of claim 3 wherein said handle section is substantially coaxial with said extension rod.

5. The fishing rod of claim 3 wherein said extension rod has a distal end and a proximal end, wherein said handle section has a distal end and a proximal end, wherein said distal end of said extension rod is attached to said proximal end of said handle section, and wherein said proximal end of said extension rod is attached to said weight.

6. The fishing rod of claim 3 wherein said extension rod extends along said longitudinal axis and wherein said weight is movably attached to said extension rod, whereby the position of said weight is adjustable along said longitudinal axis.

7. The fishing rod of claim 6 wherein said weight includes an axial passage for slidably receiving said extension rod.

8. The fishing rod of claim 3 wherein said weight has a bore, said extension rod being slidably inserted into said bore.

9. A balanced fishing rod having a tip, a handle section and a balance point, said handle section having a gripping region, said balance point being in said gripping region, said balanced fishing rod further having a counter-balance assembly attached to said handle section, said handle section being disposed between said tip and said counter-balance assembly, said counter-balance assembly comprising an extension rod and a weight, said extension rod having an axis and said weight being movably attached to said extension rod, wherein the position of said weight is adjustable along said axis of said extension rod, said weight including an axial passage for slidably receiving said extension rod, said weight further including a threaded bore extending radially from said passage for receiving a set screw, wherein said set screw is threadably insertable into said threaded bore to engage said extension rod in said passage.

10. A balanced fishing rod having a tip, a handle section and a balance point, said handle section having a gripping region, said balance point being in said gripping region, said balanced fishing rod further having a counter-balance assembly attached to said handle section, said handle section being disposed between said tip and said counter-balance assembly, said counter-balance assembly comprising an extension rod and a weight, said extension rod having an axis and said weight being movably attached to said extension rod, wherein the position of said weight is adjustable along said axis of said extension rod, said weight including an axial passage for slidably receiving said extension rod, said weight further including a groove, said groove being parallel to said passage and extending radially from said passage to an outer surface of said weight.

11. The fishing rod of claim 10 wherein said weight further includes fastening means for narrowing said groove and causing said passage to narrow to securely engage said extension rod.

12. A balanced fishing rod having a tip, a handle section and a balance point, said handle section having a gripping region, said balance point being in said gripping region, said balanced fishing rod further having a counter-balance assembly attached to said handle section, said handle section being disposed between said tip and said counter-balance assembly, said counter-balance assembly comprising an extension rod and a weight, said weight having a bore and said extension rod being slidably inserted into said bore, said counter-balance assembly further including a latch arm fixed to said weight, said latch arm having a wedge portion, said extension rod having a plurality of longitudinally spaced notches, said wedge portion of said latch arm being biased into a selected one of said notches to secure said weight relative to said extension rod.

13. A balanced fishing rod having a tip, a handle section and a balance point, said handle section having a gripping region, said balance point being in said gripping region, said balanced fishing rod further having a counter-balance assembly attached to said handle section, said handle section being disposed between said tip and said counter-balance assembly, said counter-balance assembly comprising an extension rod and a weight, wherein said extension rod is hollow and said weight is disposed within said extension rod.

14. The fishing rod of claim 13 wherein said counter-balance assembly includes a screw having a head fixedly attached to said proximal end of said handle section, said weight having a threaded bore, said screw projecting into said extension rod to threadedly engage said threaded bore.

15. The fishing rod of claim 14 wherein said extension rod is rotatably attached to said handle section, said extension rod comprising engaging means for engaging said weight, whereby said weight is caused to rotate relative to said screw when said extension rod is rotated relative to said handle section.

16. The fishing rod of claim 15 wherein said weight has a groove parallel to said bore, said engaging means including a ridge on said extension rod which runs through said groove.

17. A counter-balance assembly in combination with a fishing rod having a gripping region and a balance point, said counter-balance assembly being attachable to said fishing rod to cause said balance point to fall within said gripping region, the fishing rod including a tip and a handle section, said gripping region including a portion of said handle section, said tip causing a non-zero net torque when said fishing rod is held at a predetermined point in said gripping region, a counter-balance assembly being attachable to said handle section of said fishing rod opposite said tip, said counter-balance assembly causing a torque at said predetermined point in said gripping region of equal magnitude and opposite direction to said net torque, whereby said balance point of said fishing rod it at said predetermined point in said gripping region, the counter-balance assembly comprising a weight and an extension rod, said extension rod being attached to said handle section opposite said tip, said weight being movably attached to said extension rod whereby said weight is selectively positionable along said axis of said extension rod.

18. The counter-balance assembly of claim 17 wherein said handle section has a distal end and a proximal end, wherein said counter-balance assembly comprises an extension rod which extends from said proximal end of said handle section of said fishing rod.

19. The counter-balance assembly of claim 18 comprising a weight fixedly attached to said extension rod.

20. The counter-balance assembly of claim 18 comprising a weight movably attached to said extension rod.

21. The counter-balance assembly of claim 20 wherein said weight includes an axial passage for slidably receiving said extension rod.

22. The counter-balance assembly of claim 21 wherein said weight further includes a threaded bore extending radially from said passage for receiving a set screw, whereby said set screw is insertable into said threaded bore to engage said extension rod in said passage.

23. The counter-balance assembly of claim 21 wherein said weight further includes a groove, said groove being parallel to said passage and extending radially from said passage to an outer surface of said weight.

24. The counter-balance assembly of claim 23 wherein said weight further includes fastening means for narrowing said groove and causing said passage to narrow to securely engage said extension rod.

* * * * *